Oct. 24, 1933.    G. H. CONNORS    1,931,752
AUTOMATIC BRAKE COUPLING
Filed June 13, 1931    2 Sheets-Sheet 2
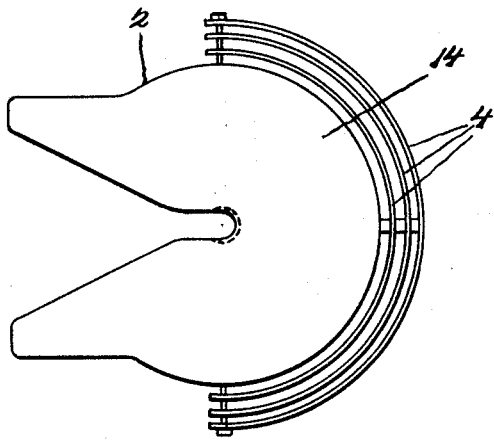
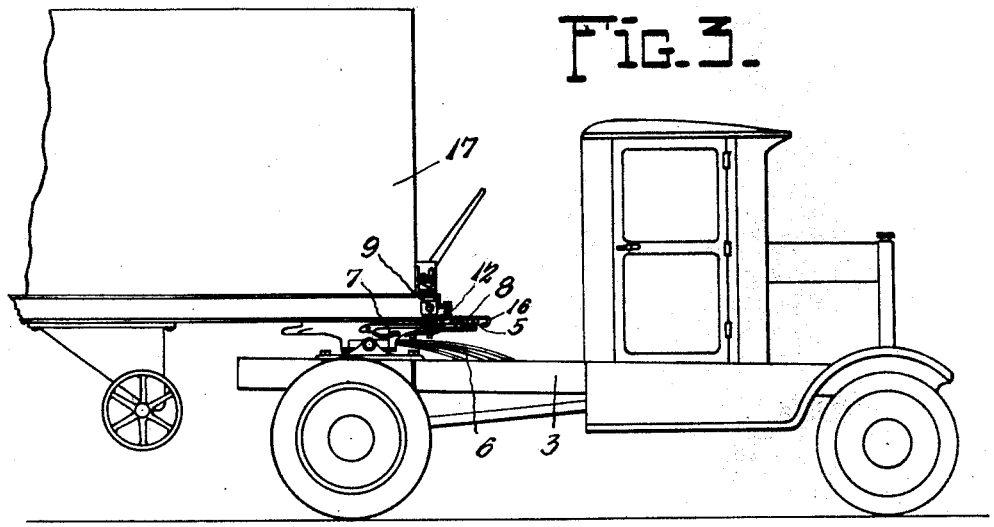
Inventor
GEORGE H. CONNORS.
By Robb & Robb
Attorneys Patented Oct. 24, 1933

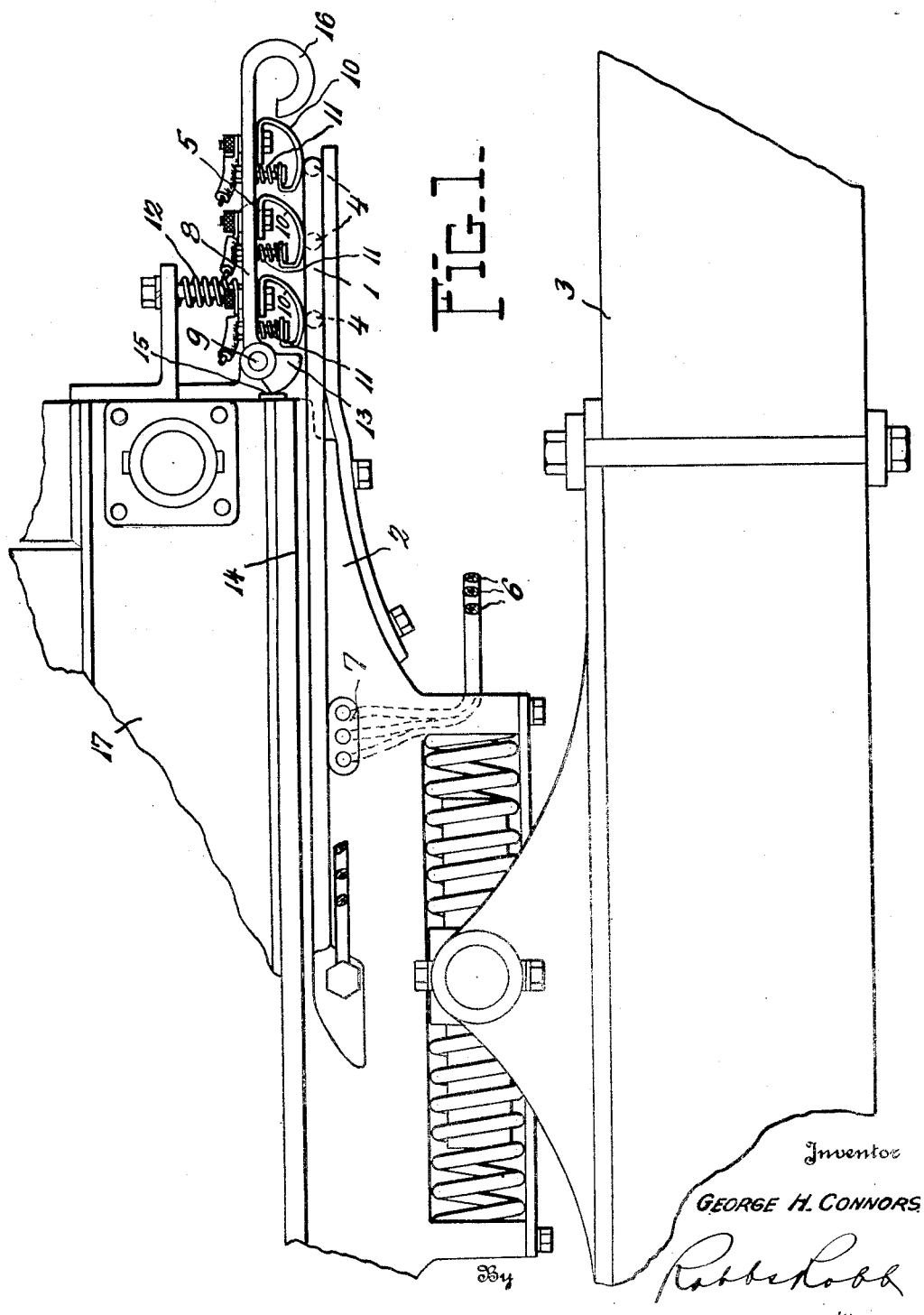

1,931,752

UNITED STATES PATENT OFFICE 1,931,752

AUTOMATIC BRAKE COUPLING

George Henry Connors, Edgerton, Wis., assignor to Highway Trailer Company, Edgerton, Wis., a corporation Application June 13, 1931. Serial No. 544,195

6 Claims. (Cl. 280—33.1)

This invention relates to automatic connecting mechanism which is primarily adapted for use in articulated vehicles such as automatic and semi-automatic tractor-trailer units.

With the present day trend toward the requiring of brakes on all trailers in such tractor-trailer units as well as on the tractor or truck, and the almost universal use of power brakes to obtain the maximum degree of safety in conformance with the rules and regulations governing vehicle brakes, especially on units of large capacity, it becomes necessary to provide suitable mechanism for connecting the various operating or actuating members which extend between the vehicles. In order to keep abreast of the progress in the full and semi-automatic coupling and uncoupling of the draft devices and associated automatically operated parts, it is desirable to provide automatic connecting mechanism for the electrical circuits extending between the separable units, such circuits being adapted to control the lights, brakes, and any other electrically operated devices which might be employed, according to the size of the units or use to which they are to be put.

To these ends, it is an object of the present invention to provide a suitable automatic connector mechanism for connecting the electric cables or conductors for the tail light, stop light, brake mechanism, running lights, etc.

A further object of the invention is to eliminate, insofar as is possible, the wear on the contacts of the connector mechanism by repeated connecting and disconnecting operations.

A still further object of the invention is to provide an automatic connector mechanism which will operate independently of the relative angle between the truck and trailer during coupling and uncoupling, thereby eliminating the necessity of substantially aligning the truck and trailer for the coupling and uncoupling operations.

Another object of the invention is to provide an automatic connector mechanism which is positive in operation, rugged in construction, and inexpensive in manufacturing cost.

It is also within the purview of the invention to provide an automatic connector mechanism which is in the form of an attachment for use on various types of combined vehicle units which are separable.

Other and further objects and advantages of the invention will be hereinafter set forth and the novel features thereof defined by the appended claims.

In the drawings,

Figure 1 is an enlarged fragmentary side elevation showing the automatic connector mechanism as applied to a tractor-trailer unit, Figure 2 is a top plan view of the lower fifth wheel member which carries the collector rings or trolleys, and Figure 3 is a fragmentary view similar to Figure 1 showing the tractor and trailer more in detail.

Like reference characters designate corresponding parts in the several figures of the drawings.

To eliminate the tangle and twist of wires commonly encountered in the conventional manner of connecting the electrical circuits on the trailer with those on the tractor or truck, requiring considerable slack in the portion of the cable spanning the space between the vehicles to permit turning about corners, there are provided suitable contact members disposed on the truck or tractor which are adapted to cooperate with contact members or brushes on the trailer. The truck contact members, generally denoted by the reference character 1 are preferably carried by the lower fifth wheel member 2 of the conventional type which is suitably disposed on the truck, generally designated 3. These contact members are preferably in the form of collector rings or trolleys 4 suitably supported on the fifth wheel and insulated therefrom and from each other. By extending the truck contacts about the forward edge of the lower fifth wheel in spaced relation to each other, it is possible to bring the trailer contact members, generally denoted by the reference character 5, into engagement with the same at substantially any angle in which the truck and trailer may be coupled or uncoupled. Suitable leads 6 extend from the source of potential on the truck, such as a storage battery, to the contacts or trolleys 4, said leads preferably being provided with a plug-in connector 7 intermediate the source of potential and the contacts for the purpose of facilitating the isolation of the source of potential and interruption of the circuit when desired.

Referring now more particularly to the trailer contact mechanism, there is preferably provided a supporting or carrier arm 8 pivotally connected to the forward edge of the trailer 17 as at 9. Disposed in spaced relation to each other and suitably insulated from the arm are the brushes or contact members 10, preferably formed of yieldable material having good electrical conductivity. If desired, suitable pressure springs 11 may be used in conjunction with the brushes to insure positive engagement between the contact members on the truck and those on the trailer. The carrier arm is also provided with means for yieldably resisting the pivotal movements of the same in an upward direction, this being the purpose of the spring 12.

Formed on the carrier arm adjacent its pivotal end is a cam member 13 which is adapted to be engaged by the upper surface 14 of the lower fifth wheel member 2 when the lower fifth wheel member is drawn out from beneath the trailer in the uncoupling operation, this engagement causing the carrier arm 8 to rock upwardly about its pivot 9 and disengage the trailer contacts 10 from the truck contacts 4 and maintain the same in an out-of-the-way position, thereby eliminating unnecessary wear as would be produced were the truck and trailer contact members both rigidly fastened in position. After separation of the vehicles, the carrier arm is forced downwardly under the influence of the spring 12 until the cam member 13 engages a stop member or lug 15 fixed to the trailer. Thus the spring 12 limits the swinging movement of the carrier arm in one direction and the stop lug 15 and cooperating cam member 13 limits the swinging movement in the opposite direction.

Formed on the forward end or free extremity of the carrier arm is a further cam member 16 which is adapted to engage the surface 14 of the lower fifth wheel at the beginning of the coupling operation of the truck and trailer to raise the carrier arm and trailer contacts out of the path of the truck contacts and maintain the same in raised position until near the end of the coupling operation, whereupon the passage of the lower fifth wheel member beyond the cam member 16 permits the trailer contacts 10 to be lowered into engagement with the truck contacts 4.

It is to be understood that the automatic connector mechanism may be employed in substantially any type of truck and trailer unit and its use is not limited to the type shown in the drawings for the purpose of illustration. Likewise, the invention is not to be limited to the disposition of the movable contacts on the trailer since the same principle may be utilized in the placing of the movable contacts on the truck and the stationary contacts on the trailer.

It is also to be understood that the number of contacts is not to be confined to three as shown in the drawings, since any number of contacts might be employed, depending upon the number of circuits extending to the trailer. If desired, one side of the circuits may be grounded in the usual manner at any suitable point.

From the foregoing, the operation of the invention should be obvious and may be briefly summarized as follows:

Assuming the parts to be in position as shown in Figures 1 and 3, the draft couplings are manipulated in any of the usual ways to permit the tractor or truck to be driven forward from beneath the trailer. In the relative movement between the vehicles, the lower fifth wheel member 2 is engaged by the cam member 13 which rocks the carrier arm about its pivot as the surface 14 of the lower fifth wheel passes beneath the cam, thereby raising the trailer contacts 10 out of the path of movement of the truck contacts 4. After complete separation of the vehicles, the carrier arm drops down by gravity or under the influence of the spring 12 until its movement is arrested by the engagement of the cam 13 with the stop lug 15. Thus the parts are automatically disconnected without any attention of the operator. Likewise in the coupling operation, no attention of the operator is required. As the truck or tractor backs under the trailer, the lower fifth wheel first engages the cam shaped portion 16 formed on the free extremity of the carrier arm to raise the trailer contacts 10 out of the path of movement of the truck contacts 4 and maintain the same in raised position until near the end of the coupling operation. As the lower fifth wheel passes from under the cam 16, the carrier arm is permitted to be lowered to bring the trailer contacts 10 into engagement with the truck contacts 4. By extending the truck contacts about the fifth wheel in a semi-circular position, the automatic connection may be effected at any angle at which the vehicle units are capable of being coupled. If desired, a housing may be placed over the connector mechanism to guard the same, such a housing being preferably removable to render the connecting mechanism readily accessible.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. Connector mechanism for vehicles of the class described, including the usual upper and lower fifth wheel members carried by a trailer and truck respectively, and contact instrumentalities therefor, the contact instrumentalities comprising a contact member carried by the fifth wheel member on the truck, a contact member for the trailer, a carrier arm for said trailer contact member pivotally connected to the forward end of said trailer and arranged to dispose said trailer contact member in engagement with the truck contact member when the truck and trailer are coupled together for combined operation, means on said carrier arm for engaging the fifth wheel member on the truck to swing said trailer contact member out of engagement with the truck contact member incident to the uncoupling of the truck and trailer, and a stop member on said trailer engageable with said means for limiting the swinging movement of the carrier arm in one direction.

2. Connector mechanism for vehicles of the class described, including the usual upper and lower fifth wheel members carried by a trailer and truck respectively, and contact instrumentalities therefor, the contact instrumentalities comprising a contact member carried by the fifth wheel member on the truck, a contact member for the trailer, a carrier arm for said trailer contact member pivotally connected to the forward end of said trailer and arranged to dispose said trailer contact member in engagement with the truck contact member when the truck and trailer are coupled together for combined operation, means on said carrier arm for engaging the fifth wheel member on the truck to swing said trailer contact member out of engagement with the truck contact member incident to the uncoupling of the truck and trailer, a stop member on said trailer engageable with said means for limiting the swinging movement of the carrier arm in one direction, and yieldable means for limiting the swinging movement of the carrier arm in the opposite direction.

3. Connector mechanism for vehicles of the class described, including the usual upper and lower fifth wheel members carried by a trailer and truck respectively, and contact instrumentalities therefor, the contact instrumentalities comprising a contact member carried by the fifth wheel member on the truck, a contact member for the trailer, a carrier arm for said trailer contact member pivotally connected to the forward end of said trailer and arranged to dispose said trailer contact member in engagement with the truck contact member when the truck and trailer are coupled together for combined operation, cam means on said carrier arm for engaging the fifth wheel member on the truck to swing said trailer contact member out of engagement with the truck contact member incident to uncoupling of the truck and trailer, and further cam means on said carrier arm for engaging the fifth wheel member on the truck during coupling of the truck and trailer to swing said trailer contact member out of the path of said truck contact member during the coupling operation and maintain the same in such position until near the end of said coupling operation.

4. Connector mechanism for vehicles of the class described, including the usual upper and lower fifth wheel members carried by a trailer and tractor respectively, and contact instrumentalities carried by the said members for supplying operating current from the tractor to the trailer, the instrumentalties comprising a plurality of arcuate collector rings substantially operatively enclosing one of the said fifth wheel members, and cooperating yieldably mounted contact brushes carried by the other fifth wheel member for engaging the collector rings incident to relative movement between the tractor and trailer while producing cooperating contact therebetween irrespective of the angular positions of the said vehicles, and instrumentalities for sharply making and breaking contact between the collector rings and brushes incident to coupling and uncoupling action of the vehicles, the instrumentalities including lifting devices for the brushes operative upon relative movement of the vehicles during coupling and uncoupling thereof.

5. Connector mechanism for vehicles of the class described, including the usual upper and lower fifth wheel members carried by a trailer and truck respectively, and contact instrumentalties therefor and comprising a plurality of concentrically disposed spaced collector trolleys enclosing the forward edge of the lower fifth wheel member, cooperating brushes on the upper fifth wheel member for engaging the respective trolleys, and instrumentalties for sharply engaging and disengaging the brushes and trolleys during coupling and uncoupling operations of the vehicles, the said trolleys and brushes being engageable by relative movements of the vehicles irrespective of the relative angular positions thereof.

6. Connector mechanism for vehicles of the class described, including the usual upper and lower fifth wheel members carried by a trailer and tractor respectively, and contact instrumentalities therefor for supplying operating current from the tractor for brakes and the like on the trailer, comprising collector rings enclosing the forward edge of the lower fifth wheel member, movably mounted cooperating brushes on the upper fifth wheel member for engaging the collector rings, and instrumentalities for lifting the brushes from the collector rings incident to relative movement between the tractor and trailer while producing cooperating contact therebetween irrespective of the angular positions of the said vehicles.

GEORGE HENRY CONNORS.